United States Patent [19]
Tarran

[11] 4,235,449
[45] Nov. 25, 1980

[54] COMBINED HAND TRUCK AND STEP STOOL
[76] Inventor: Phil K. Tarran, 121 W. Orange Ave., Vista, Calif. 92083
[21] Appl. No.: 916,948
[22] Filed: Jun. 19, 1978
[51] Int. Cl.³ .............................................. B62B 1/04
[52] U.S. Cl. .................................. 280/30; 280/47.28
[58] Field of Search ................... 280/30, 47.28, 47.29; 182/16, 20, 21, 23, 127; 297/129, 118; D12/34

[56] References Cited
U.S. PATENT DOCUMENTS

| | | | |
|---|---|---|---|
| D. 198,676 | 7/1964 | Tarran | D12/34 |
| 794,741 | 7/1905 | Pray | 280/47.28 |
| 3,430,972 | 3/1969 | Fiedler | 280/30 |
| 3,954,155 | 5/1976 | Guidara | 280/30 |

Primary Examiner—John J. Love
Assistant Examiner—Randall A. Schrecengost
Attorney, Agent, or Firm—Brown & Martin

[57] ABSTRACT

A hand truck having side frame rails which are hinged near the center to fold and act as ground engaging stabilizers for supporting the structure in a step stool configuration. Cross braces between the frame rails serve as steps and the bed of the truck becomes the top platform of the step stool. The truck has a retractable extension bed, which, in the step stool configuration, interlocks with the folded frame rail portion to form a rigid triangular braced structure. Normal use of the unit as a load carrying hand truck is not compromised by the step stool forming elements.

9 Claims, 4 Drawing Figures

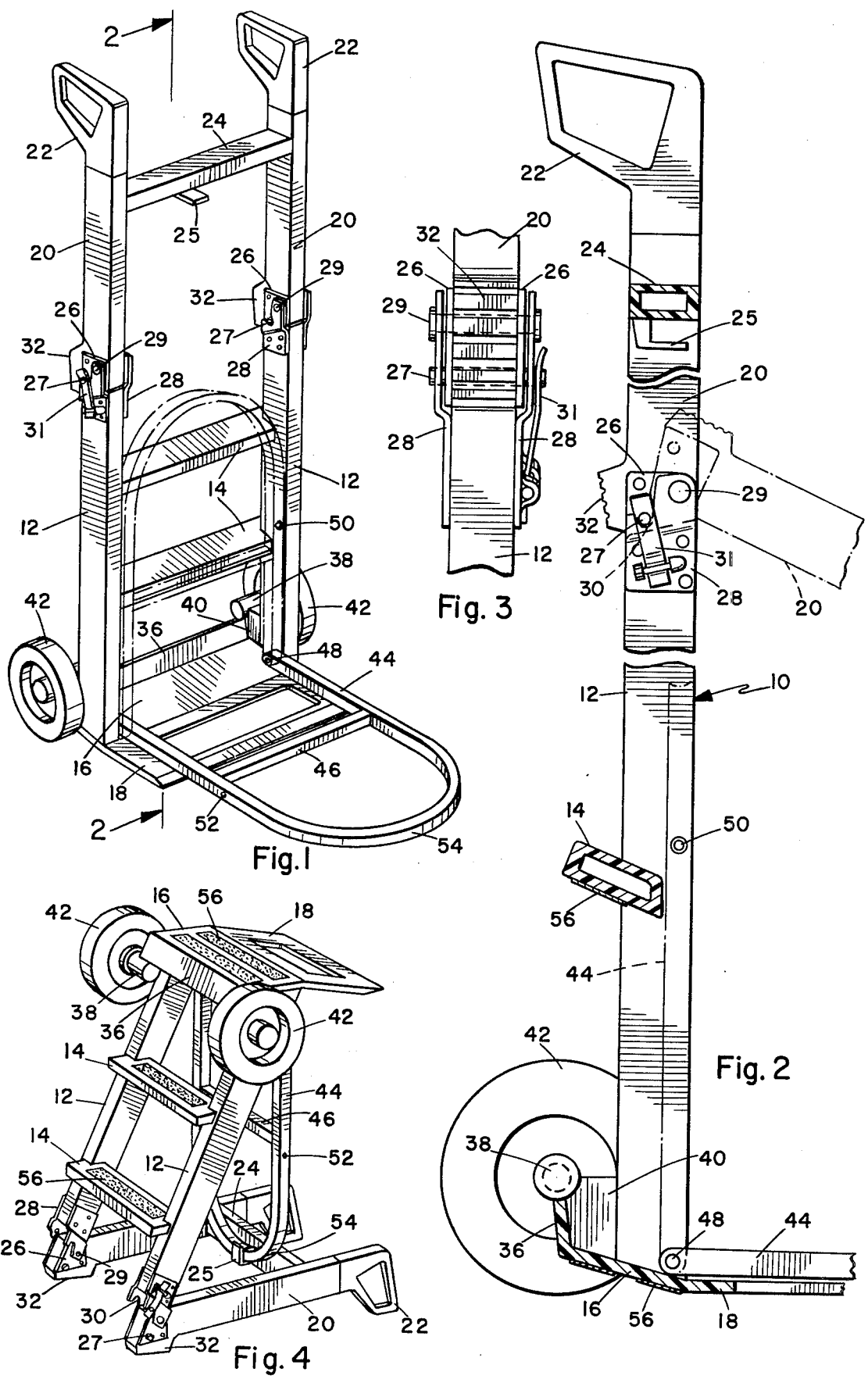

COMBINED HAND TRUCK AND STEP STOOL

BACKGROUND OF THE INVENTION

Hand trucks have been developed to incorporate features which enable them to be used for various purposes. For instance, by suitable position of bracing structure the frame can serve as a ladder. A typical example of a hand truck and ladder combination is shown in U.S. Pat. No. D 198, 676. This type of structure must be supported against a wall or other upright surface in the manner of a conventional ladder, which may not always be convenient.

SUMMARY OF THE INVENTION

The hand truck described herein is an efficient load carrying unit in normal use and has a retractable extension bed for supporting large objects. The basic frame has side rails connected by spaced cross braces and a load supporting bed with a projecting foot. An extension bed frame is hinged between the rails when not in use. The side rails are hinged so that the upper portions can be folded forward. When the structure is inverted, the folded side rails rest on the ground and the base portion of the frame extends upwardly at an angle, the cross braces forming steps and the bed providing a top platform or or seat. In the step stool position the extension bed is pulled out and locked into a retainer on the folded side rail structure, to form a rigid, triangular braced, self-supporting unit. Conversion between the hand truck and step stool configurations can be accomplished in a few seconds without tools.

The primary object of this invention, therefore, is to provide a new and improved combined hand truck and step stool.

Another object of this invention is to provide a hand truck in which the frame folds into a step stool configuration, with steps incorporated into the frame bracing structure.

A further object of this invention is to provide a hand truck and step stool combination in which the basic structure forms a rigid effective unit in either configuration.

Other objects and advantages will be apparent in the following detailed description, taken in conjunction with the accompanying drawing, in which:

FIG. 1 is a perspective view of the hand truck, with the extension bed shown in two positions.

FIG. 2 is an enlarged sectional view taken on line 2—2 of FIG. 1.

FIG. 3 is an enlarged rear view of the hinge as taken from the left hand side of FIG. 2.

FIG. 4 is a perspective view of the structure in the step stool configuration.

DESCRIPTION OF THE PREFERRED EMBODIMENT

The basic structure of the unit is indicated as being made of plastic material, for a low cost general use application, but could obviously be of any other suitable materials depending on the intended use and load carrying requirements.

The basic frame 10 has a pair of elongated side rails 12 joined by spaced cross braces 14. At the lower ends the side rails 12 are fixed to a rigid bed 16, having a forwardly extended foot 18 substantially perpendicular to the side rails for supporting a load. The upper portions 20 of the side rails are fitted with hand grips 22 and are connected by an upper cross brace 24. Below the central portion of upper cross brace 24 is a forwardly opening retaining hook 25.

At approximately two-thirds of their length above bed 16, the side rails are hinged to swing forwardly. The lower end of each upper portion 20 is reinforced by said plates 26, through which is secured a latch pin 27 projecting on both sides. On the upper end of the lower portion of each side rail 12 are hinge brackets 28 which straddle the reinforcing plates 26 and are held by a hinge pin 29. Hinge brackets 28 have notches 30 to receive latch pin 27, and attached to one hinge bracket is a latch member 31 which locks over one projecting end of the latch pin. The latch member 31 may be resilient to snap over the latch pin, or could have a spring to seat the latch as the side rails are extended. On the lower end of each upper portion 20 is a foot 32 projecting from the same side as hand grip 22.

The rear portion of bed 16 has an upwardly extending flange 36 on which are secured bearings 38, braced to side rails 12 by gussets 40. Suitable wheels 42 are mounted in the bearings 38, which are positioned so that the wheels and foot 18 rest on the ground surface with the frame 10 substantially upright, as in FIG. 2. Standing support for the hand truck is thus provided in the normal manner.

At the lower end of the frame is a generally U-shaped extension bed frame 44 having a cross brace 46. The extension bed 44 fits between side rails 12 and is attached to the lower ends of the rails by hinge pins 48. In the lowered position, indicated in full line in FIG. 1 and 2, the extension bed 44 rests on foot 18 and provides an enlarged load supporting structure. Extension bed 44 can be hinged upwardly to retract between the side rails 12 as in the broken line position in FIGS. 1 and 2. The extension bed is held in the retracted position by spring detents 50 mounted in side rails 12 and engaging sockets 52 in the extension bed frame member.

The cross braces 14 are inset in the frame 10 to allow the extension bed to retract flush into the frame. The cross braces also extend rearwardly from the frame 10 and are inclined to serve as substantially horizontal steps in the step stool position.

To convert the hand truck to a step stool the latch members 31 are pulled out and the upper side rail portions 20 are hinged forwardly and the unit is inverted. In the folded position the upper and lower portions of the side rails are at an acute angle to each other. With the feet 32 and hand grips 22 resting on the ground, extension bed 44 is pulled out and the U-shaped closed end portion 54 is inserted into retaining hook 25, as in FIG. 4. The basic portion of frame 10 is thus supported in an inclined position, with cross braces 14 forming the steps of a short step ladder. The folded frame and extension bed 44 form a very rigid triangular structure which is completely self-supporting as a step ladder. Strips of non-slip tread material 56 are applied to the undersides of cross braces 14 and bed 16 to provide a secure footing. Bed 16 also serves as a seat, allowing the unit to be used as a stool.

To reconvert to a hand truck the extension bed 44 is lifted from retaining hook 24 and snapped into its retracted position. The side rails are then straightened out and latch members 32 engaged.

The structure is very simple and requires no tools for conversion to either configuration, resulting in a versatile unit with a wide variety of uses.

Having described my invention, I claim:

1. A combined hand truck and step stool comprising:

a frame having a pair of elongated side rails with longitudinally spaced interconnecting cross braces fixed therebetween;

said frame having a lower end with a rigidly attached bed and an extended load supporting foot fixed thereto;

wheels rotatably mounted on said lower end;

said side rails having hinged upper portions selectively movable to a folded position at an acute angle to the respective lower portions of the side rails;

and a support having means for connection between the lower portion of said frame and said upper portions to form a substantially triangular braced structure with the bed becoming the top step of the stool formed in the folded position of the frame.

2. A combined hand truck and step stool according to claim 1, wherein said support comprises an extension bed pivotally attached to the lower end portion of said frame, to swing between a retracted position between the side rails and an extended position resting on said foot.

3. A combined hand truck and step stool according to claim 2, wherein said extension bed is a generally U-shaped frame member having inner ends coupled to the frame and a closed outer end portion; said upper portions having retaining means for engagement with said closed end portion.

4. A combined hand truck and step stool according to claim 3, and including an upper cross brace fixed between said upper side rail portions;

said retaining means comprising a retaining hook on said upper cross brace for receiving said closed end portion.

5. A combined hand truck and step stool according to claim 3, wherein said cross braces are inset from one side of the side rails to clear said extension bed in the retracted position, said cross braces projecting from the other side of the side rails and comprising steps.

6. A combined hand truck and step stool according to claim 5, and including non-slip tread material fixed on the underside of said cross braces.

7. A combined hand truck and step stool according to claim 1, and including locking means at the hinged connections of said side rails for holding the side rails in extended position.

8. A combined hand truck and step stool according to claim 1, and including hand grips attached to said upper portions, said grips also serving as one set of feet for supporting the triangular based structure on the ground.

9. A combined hand truck and step stool as claimed in claim 1 wherein in the folded position of the frame, the upper portion forms the base of the triangular braced structure and the support together with the lower portion forms the sides of the triangle.

* * * * *